Patented Sept. 4, 1934

1,972,546

UNITED STATES PATENT OFFICE 1,972,546

PROCESS OF RECOVERING HALOGENS

Harry E. Bierbaum, Long Beach, Calif., assignor to General Salt Company, Los Angeles, Calif., a corporation of California No Drawing. Application May 6, 1933,
Serial No. 669,795

20 Claims. (Cl. 23—217)

This invention relates to the recovery of halogens, and particularly to processes for the recovery of iodine or other halogen from oil-field brines or other solutions containing the same, in which the solution is first treated, if necessary, to convert the halogen to the form of free or elemental halogen, after which the halogen is adsorbed on charcoal or other suitable adsorbent agent and is then converted by suitable chemical treatment into soluble salts or compounds which are dissolved from the adsorbent agent and recovered by further treatment of the resultant liquor. The invention is particularly directed to the treatment of brines or other solutions containing a halogen in the presence of organic impurities. The presence of such impurities has been found to be quite disadvantageous in the commercial operation of such processes, since these impurities are largely adsorbed in the adsorbent agent, along with the halogen, and are subsequently removed therefrom with the halogen, resulting in the production of an impure halogen product, a reduction in the yield obtainable, and in certain operating difficulties.

It has been hitherto proposed to partially overcome these disadvantages by the removal of such impurities through suitable purification treatment, such treatment being applied either to the brine or solution prior to the adsorption step, or to the halogen-containing liquor obtained by chemical treatment and leaching of the halogen-containing adsorbent agent. Such purification methods, however, have not only added an additional step or steps to the process but have failed to effect a complete removal of the above described impurities so that, at best only a partial elimination of the above-mentioned disadvantageous process characteristics has been obtained.

The principal object of this invention is to provide a new and advantageous method of removing or eliminating organic or volatile impurities present in such a process, and to also provide an improved method of halogen recovery involving such a method of elimination of impurities.

A particular object of the invention is to obtain a substantially complete elimination of such impurities, prior to the leaching or solution of the halogen compounds or salts from the adsorbent agent, so as to entirely eliminate the presence of these impurities in the succeeding steps of the process and thus eliminate the attendant operating difficulties.

A further object of the invention is to eliminate the necessity of purification of the halogen-containing liquor obtained by leaching the adsorbent agent.

A further object of the invention is to permit the use of a smaller amount of water than heretofore required for leaching the halogen salts or compounds from the adsorbent agent and thus obtain a more concentrated halogen-containing liquor. In this manner, the evaporation of water from the liquor, for the purpose of concentration, prior to the recovery of the halogen therefrom, may be partly or entirely eliminated.

A further object of the invention is to obtain a leached liquor substantially free of impurities, which may be more advantageously treated for the recovery of halogen, either by precipitation or sublimation. In case chemical treatment is used as a means of effecting precipitation or recovery of the halogen from such liquor, the amount of chemicals required for such treatment is thus materially reduced. Furthermore, the halogen product obtained, by precipitation, sublimation, distillation, or other suitable treatment, is of higher purity.

A further object of the invention is to obtain a higher yield of halogen, due to more complete removal of the halogen salts or compounds from the adsorbent agent in the leaching operation and to a more complete recovery of the halogen from the leached liquor by precipitation or sublimation. A further increase in yield is obtained, due to the fact that the purification method of the present invention leads to the recovery of halogen contained in organic halogen compounds adsorbed in the adsorbent agent, and furthermore, eliminates the tendency to form additional organic halides upon acidification of the leached liquor prior to precipitation or sublimation. The formation of organic halogen compounds at this stage of the process is prevented by the elimination of organic impurities prior to the leaching operation.

In the recovery of iodine, the fact that the iodine product obtained by precipitation or sublimation from the leached liquor is of higher purity also results in a further increase in final yield, due to the fact that the time required for drying the iodine crystals is materially reduced, which results in a corresponding reduction in the loss of iodine due to volatilization during the drying operation.

A further object of the invention is to reactivate or improve the adsorbent properties of the adsorbent agent remaining after leaching of the halogen salts or compounds therefrom. Since economical operation of a process of the type above described demands that the adsorbent be repeatedly re-used for adsorption of halogen from further quantities of brine or solution, it will be obvious that the improvement in the adsorbent properties of the recovered adsorbent agent thus effected will enable a higher recovery of halogen by adsorption in the re-used agent, or a reduction in the amount of such agent required. Furthermore, the settling of the adsorbent from the brine or solution, following the adsorption step, is rendered more rapid and complete, due to the improvement in physical properties thereof.

In the process of the present invention, the elimination of organic or volatile impurities is effected by heating the adsorbent mass, following the adsorption of halogen therein and the chemical treatment for conversion of the halogen to substantially non-volatile salts or other compounds, to a sufficient temperature to eliminate organic impurities, together with any other volatile impurities which may be present.

The chemical treatment to which the adsorbed halogen is subjected, prior to the heating operation for removal of organic impurities, consists in treatment with a reagent adapted to react with elemental halogen to form a substantially non-volatile compound or substance, that is, a substance which is substantially non-volatile at the temperature employed in said heating operation; according to a preferred embodiment of the process, the chemical treatment serves to convert the halogen to a water-soluble compound or compounds, so that the recovery thereof from the adsorbent, following the heating operation, may be effected by a water-washing or leaching of the adsorbent mass.

When charcoal is used as the adsorbent agent, heating of the adsorbent mass is preferably conducted in an enclosed chamber, by application of indirect heat, with the substantial exclusion of oxygen, whereby oxidation of the charcoal itself is prevented. The character of the heating is such that a decomposition or destructive distillation of the organic impurities is obtained, without dissociation or volatilization of the halogen salts or compounds. Impurities of an oily nature, as well as other organic impurities present in the charcoal mass, are eliminated by such heat treatment, either by volatilization, or by conversion thereof into coke or other solid carbonaceous residuum in substantially insoluble state deposited on the charcoal. It has been found practical to heat the charcoal mass to a temperature of from between 400° and 500° F., which produces substantially complete elimination of organic impurities, without loss of halogen by decomposition or volatilization of the halogen salts or compounds.

If desired, the heating may be conducted under super-atmospheric or subatmospheric pressure conditions, but it has been found quite practical to conduct the heating at ordinary atmospheric pressures. The volatile organic constituents of the charcoal mass removed by heating, may be recovered, if desired, by condensation, absorption, chemical treatment or in any other suitable manner.

In the treatment of oil-field brines by charcoal adsorption methods, a considerable amount of organic matter is picked up by the adsorbent charcoal and while some of the halogen may be present in the charcoal in combination with organic matter, the treatment used for conversion of the halogen to non-volatile salts will, in general, cause the principal proportion of such halogen to be taken out of combination with the organic matter, but the organic matter itself remains, and the present disclosed treatment of the charcoal mass after the chemical conversion of the adsorbed elemental halogen serves to remove the organic matter bodily, or at least convert it into a state which does not interfere with the halogen recovery in the subsequent steps of the process.

After the heat treatment is completed, and the organic impurities substantially completely eliminated, the remaining charcoal mass is subjected to further treatment for the recovery of the halogen-containing compound or substance therefrom. For example, if the halogen has been converted into a water-soluble substance, it may be recovered by washing or leaching with water.

As an example of the application of the present invention to the commercial recovery of iodine from oil-field brines, the brine is first treated to convert any combined iodine into elemental iodine, for example, by acidification and oxidation in any well-known manner, and adsorbent charcoal is then added for the purpose of taking up the iodine. This charcoal is separated from the brine by settling or filtration, and is then treated with a reagent capable of reacting with the iodine to form a substantially non-volatile substance, for example, with an aqueous solution of an alkali, such as caustic soda, caustic potash, or alkali-metal carbonate. Hitherto it has been customary to digest the charcoal with the alkaline solution and then subject the mass to filtration and washing with water to extract the soluble iodine salts from the charcoal. This procedure succeeds in converting the iodine into the desired water-soluble salts, but a considerable amount of organic matter is also caused to enter the water, either in solution or in suspension, and is thus caused to be present during the subsequent steps for recovery of the iodine in commercially marketable form. According to a preferred embodiment of the present invention, however, the iodine-containing charcoal is treated with an aqueous alkaline solution such as above-mentioned, preferably in slight excess over the amount theoretically required for conversion of the iodine, and is then subjected to the heating operation above-described. This may advantageously be accomplished by making the charcoal into a slurry with the alkaline solution, and then evaporating the moisture from the slurry, after which the mass may be heated to a temperature of approximately 450° F., as an example, in an enclosed chamber with exclusion of oxygen, and the organic matter eliminated. Due to the fact that the charcoal is treated with alkali in this manner, only a slight excess of the theoretical amount of such alkali is required for the conversion reaction, and thus there is an important economy in consumption of reagents obtained in this particular step. The reason for the fact that a smaller excess of the alkaline reagent is required for conversion of the elemental iodine to a salt, is that as the slurry is evaporated to dryness a concentration of unreacted alkaline solution is continually obtained, and thus the conversion reaction can progress to the desired end without requiring that a large amount of reagent be kept in solution.

Any suitable form of apparatus may be employed for the heating operation, but I prefer to use an apparatus which provides for evaporation of the slurry to dryness under conditions of agitation, and which is adapted for proper heating of the dried mass to the desired temperature while providing for suitable heat-transfer through the mass for uniform heating. The apparatus should provide for the substantial exclusion of oxygen during the heating operation when charcoal is employed as the adsorbent agent, and should preferably also provide for agitation of the mass to prevent caking and occlusion of volatilized impurities.

After the heating operation, the charcoal, which now contains substantially only the iodine salts and that portion of the organic matter which has been converted to coke or the like, is subjected to a water leaching operation. It has been found that only about one-half the hitherto-required amount of water is necessary for this leaching operation, which effects a further economy in operation in view of the fact that it has been hitherto considered preferable to evaporate the liquor obtained by leaching, to obtain a concentration of the salts therein before proceeding further with the process. It is believed that the leaching operation requires less water than has been hitherto considered necessary for the reason that substantially no organic matter is present in the charcoal mass. It has been noted that considerably more water than a theoretical consideration would call for has been hitherto necessary for leaching of the charcoal mass, and the logical assumption is that the organic matter present has acted to mechanically interfere with the leaching action. The fact that only a slight excess of the alkaline reagents remain in the charcoal mass after the heating operation according to the present invention, may also contribute to the ease of leaching.

The leached charcoal is used for further adsorption of iodine from the brines, and it has been found that this charcoal is materially more adsorptive than charcoal which has been leached as above described without removal of the organic matter by heating. This appears quite logical in view of the fact that any organic matter present in the charcoal will necessarily seriously interfere with subsequent adsorption and will diminish the adsorptive power thereof, and removal of the organic matter from the charcoal in the present described manner acts to revivify the charcoal and thus enable the same to take on further quantities of iodine. It has been found that charcoal recovered in the manner herein set forth may be re-used a materially greater number of times before becoming worthless for adsorption use, than has been hitherto possible. This feature of the present process adds still another economy in operation.

The liquor obtained by leaching the heated charcoal is then treated with acid or the like, preferably in the presence of a suitable oxidizing agent such as potassium dichromate or chlorine, and the iodine converted into free state. If desired, the liquor may be concentrated by evaporation before the oxidation step, but in general this is not necessary in the present process due to the reduced amount of water used in the leaching operation. As above pointed out, it has been hitherto considered preferable to concentrate this liquor, but the present process provides for obtaining a liquor of the desired concentration directly, without such concentration procedure. The absence of organic matter in the liquor enables a lesser amount of oxidizing agent to be used, and the fact that only a slight excess of alkali is present enables a lesser amount of acid to be used in obtaining the desired acid-concentration for liberation of the iodine. Thus, further economies in the process are realized, due to a lowered consumption of reagents.

It is customary to recover the freed iodine from the liquor by filtration, or by direct sublimation, and inasmuch as the iodine is produced in a substantially organic-free state, it is of relatively high purity, and the time required for drying of the resulting iodine crystals is materially lowered, which obtains a lower iodine loss in this portion of the recovery process.

It will be apparent that the process of the present invention is not limited to the use of a reagent which will convert the adsorbed iodine or other halogen into a water-soluble material prior to the heating operation, as set forth in the above specific embodiment, but is equally adaptable when an agent such as silver nitrate is used to convert the halogen into a water-insoluble, non-volatile substance, such as a silver halide, from which the halogen may be recovered by subjecting the adsorbent mass to suitable chemical treatment and leaching according to known methods, subsequent to the heating operation.

While the specific embodiment of the present invention is directed to the recovery of iodine from oil-field brines, it will be apparent that this invention is applicable to the recovery of other halogens such as for example, bromine, from any brine or liquor which is contaminated with organic matter.

I claim:

1. The process for recovery of halogens from solutions containing the same which comprises: adsorbing elemental halogen on an adsorbent agent; converting the elemental halogen into a substantially non-volatile substance; subjecting said adsorbent agent and said substance to a heating operation to eliminate organic matter therefrom; separating said substance from said adsorbent agent; converting the halogen contained in said substance to elemental form; and recovering the halogen.

2. The process of recovering a halogen from a solution containing the same which comprises: converting the halogen into elemental form; adsorbing elemental halogen on charcoal; converting said elemental halogen into a substantially non-volatile substance, heating said substance and said charcoal with the substantial exclusion of oxygen to eliminate organic matter present therewith; separating said substance from said charcoal; converting said halogen contained in said substance to elemental form; and recovering said halogen.

3. The process of recovering iodine from solutions containing the same which comprises: converting the iodine to elemental form; adsorbing said iodine on charcoal; converting said iodine to a substantially non-volatile substance; heating said charcoal and said substance in the substantial absence of oxygen to eliminate organic impurities therefrom; separating said substance from said charcoal; converting the iodine contained in said substance to elemental iodine; and recovering said iodine.

4. In a process for recovery of halogens from solutions containing the same, the steps which comprise: adsorbing elemental halogen on an adsorbent agent; converting said elemental halogen into a water-soluble salt thereof; subjecting said adsorbing agent and said salt to a heating operation to eliminate organic matter therefrom;

leaching said salt from said adsorbent agent; converting the halogen contained in said salt to elemental form; and recovering the halogen.

5. In a process for recovery of a halogen from solutions containing the same, the steps which comprise; adsorbing elemental halogen on charcoal; converting said elemental halogen into a water-soluble salt; heating said salt and said charcoal with the substantial exclusion of oxygen to eliminate organic matter present therewith; leaching said charcoal to obtain a water solution of said salt; converting said halogen in said salt to elemental form; and recovering said halogen.

6. In a process for recovering iodine from solutions containing the same, the steps which comprise: adsorbing elemental iodine on charcoal; converting said iodine to water-soluble salts thereof; heating said charcoal and said salts in the substantial absence of oxygen to eliminate organic impurities therefrom; taking up said iodine salts in water solution; converting the iodine contained therein to elemental iodine; and recovering said iodine.

7. In a process for recovering a halogen from solutions containing the same, the steps which comprise: adsorbing elemental halogen on an adsorbent agent; converting said halogen to water-soluble salts; and heating said salts and said adsorbent agent to eliminate organic impurities therefrom.

8. In a process for recovery of a halogen from solutions containing the same, the steps which comprise: adsorbing elemental halogen on charcoal; converting said halogen into water-soluble salts; and heating said charcoal and said salts in the substantial absence of oxygen to remove organic impurities therefrom.

9. In a process for recovering iodine from solutions containing the same, the steps which comprise: adsorbing elemental iodine on charcoal; converting said iodine into water-soluble salts thereof; and heating said water soluble salts and said charcoal in the substantial absence of oxygen to remove organic impurities therefrom.

10. The invention set forth in claim 9, said salts and said charcoal being heated to a temperature of between 400° and 500° F.

11. In a process for recovery of iodine, the step which comprises: heating an adsorbent agent containing a water-soluble salt of iodine to remove organic impurities therefrom.

12. In a process for recovering iodine, the step which comprises: heating charcoal containing a water-soluble salt of iodine to a temperature between 400° and 500° F. in the substantial absence of oxygen.

13. In a process for recovery of a halogen from solutions containing the same, the steps which comprise: adsorbing elemental halogen on an adsorbent agent; treating said adsorbent agent with an aqueous solution of an alkaline material in slight excess over the theoretical amount required for conversion of said halogen into water-soluble salts thereof, and forming a slurry; reducing said slurry to a dry mass; heating said mass to eliminate organic impurities therefrom; leaching said mass with water to separate said water-soluble salts from said adsorbent agent; and recovering the halogen from said water-soluble salts.

14. The invention set forth in claim 13 and comprising in addition: re-using said adsorbent agent obtained by said leaching in the adsorption of further quantities of halogen.

15. In a process for recovering iodine from solutions containing the same, the steps which comprise: adsorbing elemental iodine on charcoal; treating said charcoal in slight excess with an alkaline reagent to convert said iodine into water-soluble salts and form a slurry; reducing said slurry to a dry mass; heating said mass in the substantial absence of oxygen to eliminate organic impurities therefrom; separating said salts from said charcoal by leaching with water; and converting the iodine contained in said salts to elemental iodine.

16. The invention set forth in claim 15, and comprising in addition: re-using the charcoal separated from said water-soluble salts by said leaching for the adsorption of further quantities of elemental iodine.

17. In a process for recovering a halogen from solutions containing the same, the steps which comprise: adsorbing elemental halogen on an adsorbent agent; converting said halogen into a substantially non-volatile substance; heating said adsorbent agent and said substance to eliminate organic impurities therefrom; and recovering said halogen in elemental form.

18. In a process for recovering iodine from solutions containing the same, the steps which comprise: adsorbing elemental iodine on charcoal; converting said iodine to a substantially non-volatile substance; heating said charcoal and said substance in the substantial absence of oxygen to eliminate organic impurities therefrom; and recovering said iodine in elemental form.

19. In a process for recovery of iodine, the step which comprises: heating an adsorbent agent containing a substantially non-volatile iodine-containing substance to remove organic impurities therefrom.

20. In a process for recovering iodine, the step which comprises: heating charcoal containing a substantially non-volatile iodine-containing substance to a temperature between 400° and 500° F. in the substantial absence of oxygen.

HARRY E. BIERBAUM.